United States Patent
Cohn et al.

(10) Patent No.: US 11,734,674 B2
(45) Date of Patent: Aug. 22, 2023

(54) SYSTEM AND METHOD FOR TOKENIZING INFORMATION FROM A DIGITAL WALLET HOST BY AN ACQUIRER PROCESSOR

(71) Applicant: Worldpay, LLC, Symmes Township, OH (US)

(72) Inventors: William H. Cohn, Lexington, MA (US); Sayid Shabeer, Ashland, MA (US); David Tarbox, Boxford, MA (US)

(73) Assignee: Worldpay, LLC, Symmes Township, OH (US)

( * ) Notice: Subject to any disclaimer, the term of this patent is extended or adjusted under 35 U.S.C. 154(b) by 124 days.

(21) Appl. No.: 16/906,810

(22) Filed: Jun. 19, 2020

(65) Prior Publication Data

US 2020/0320513 A1   Oct. 8, 2020

Related U.S. Application Data

(63) Continuation of application No. 14/990,917, filed on Jan. 8, 2016, now Pat. No. 10,796,301.

(51) Int. Cl.
  *G06Q 20/36* (2012.01)
  *G06Q 20/40* (2012.01)

(52) U.S. Cl.
  CPC ....... *G06Q 20/363* (2013.01); *G06Q 20/3674* (2013.01); *G06Q 20/401* (2013.01); *G06Q 2220/00* (2013.01)

(58) Field of Classification Search
  None
  See application file for complete search history.

(56) References Cited

U.S. PATENT DOCUMENTS

| | | | |
|---|---|---|---|
| 9,195,984 B1* | 11/2015 | Spector | G06Q 20/367 |
| 2003/0172028 A1 | 9/2003 | Abell et al. | |
| 2007/0094150 A1 | 4/2007 | Yuen et al. | |
| 2008/0005037 A1 | 1/2008 | Hammad et al. | |
| 2014/0344153 A1* | 11/2014 | Raj | G06Q 20/3821 |
| | | | 705/44 |
| 2015/0032627 A1* | 1/2015 | Dill | G06Q 20/385 |
| | | | 705/44 |
| 2015/0095134 A1* | 4/2015 | Parker | G06Q 20/322 |
| | | | 705/21 |
| 2015/0106239 A1 | 4/2015 | Gaddam et al. | |
| 2015/0112870 A1* | 4/2015 | Nagasundaram | G06Q 20/401 |
| | | | 705/67 |
| 2015/0120472 A1 | 4/2015 | Aabye et al. | |
| 2015/0199679 A1* | 7/2015 | Palanisamy | G06Q 20/385 |
| | | | 705/67 |
| 2015/0310686 A1 | 10/2015 | Backert et al. | |
| 2015/0356560 A1* | 12/2015 | Shastry | G06Q 20/38215 |
| | | | 705/64 |

(Continued)

*Primary Examiner* — Chrystina E Zelaskiewicz
(74) *Attorney, Agent, or Firm* — Bookoff McAndrews, PLLC

(57) ABSTRACT

Systems and methods are provided for receiving an encrypted payment payload from a digital wallet host, transmitting a low value token to a merchant, receiving an authorization request, requesting authorization for the transaction from an issuer financial institution using financial data from the encrypted payment payload, receiving an authorization decision from the issuer financial institution, and transmitting an authorization response to the merchant.

18 Claims, 3 Drawing Sheets

(56) References Cited

U.S. PATENT DOCUMENTS

| | | |
|---|---|---|
| 2016/0098726 A1 | 4/2016 | Karaki |
| 2016/0127134 A1 | 5/2016 | Goldstone et al. |
| 2016/0210626 A1* | 7/2016 | Ortiz ..................... G06Q 20/12 |
| 2016/0269391 A1* | 9/2016 | Gaddam ............. H04L 63/0807 |
| 2017/0200150 A1* | 7/2017 | Cohn ............... G06Q 20/38215 |

* cited by examiner

SYSTEM AND METHOD FOR TOKENIZING INFORMATION FROM A DIGITAL WALLET HOST BY AN ACQUIRER PROCESSOR

CROSS-REFERENCE TO RELATED APPLICATION(S)

This patent application is a continuation of and claims the benefit of priority to U.S. Nonprovisional patent application Ser. No. 14/990,917, filed on Jan. 8, 2016, the entirety of which is incorporated herein by reference.

TECHNICAL FIELD

The systems and methods described below relate generally to the field of digital wallet based transactions in a payment ecosystem. More particularly, the systems and methods relate to the field of tokenizing information from a digital wallet host by an acquirer processor.

BACKGROUND

A digital wallet (e.g., Visa Checkout, MasterPass, Amex Checkout, PayPal, and Android Pay) is an encrypted storage medium that includes financial data of a consumer that can be used to complete electronic purchase transactions (e.g., a digital wallet based transaction) from a consumer computing device, such as a mobile device or laptop computer. Each digital wallet originates from, and is hosted by, a digital wallet host (e.g., Visa, MasterCard, American Express, PayPal, and Google). Each time a consumer initiates an electronic purchase transaction at a merchant using a digital wallet, the appropriate digital wallet host communicates with the merchant to complete the transaction. Each digital wallet host, however, employs a unique communication format (e.g., payload layout and encryption/decryption strategy) for its digital wallets. As a result, each merchant must handle transactions from each of the digital wallet hosts differently, which can be difficult, time consuming, and can result in low adoption of the various available digital wallets.

SUMMARY

In an embodiment, the present disclosure is directed, in part, to a computer-implemented method. The computer-implement method comprises receiving, by an acquirer processor from a digital wallet host, an encrypted payment payload in response to a digital wallet based transaction initiated by a consumer at a merchant presentation page, wherein the encrypted payment payload comprises financial data of a finance account of the consumer, and the finance account is maintained by an issuer financial institution. The method further comprises transmitting, by the acquirer processor, a low value token to the merchant, the low value token being devoid of the financial data, and receiving, by the acquirer processor from the merchant, an authorization request for the digital wallet based transaction, the authorization request comprising the low value token. The method still further comprises requesting, by the acquirer processor, authorization for the transaction from the issuer financial institution using the financial data from the encrypted payment payload, and receiving, by the acquirer processor, an authorization decision for the transaction from the issuer financial institution. The method further comprises transmitting, by the acquirer processor to the merchant, an authorization response.

In an embodiment, the present disclosure is directed, in part, to a non-transitory computer readable medium having instructions stored thereon which, when executed by a processor, cause the processor to receive, by an acquirer processor from a digital wallet host, an encrypted payment payload in response to a digital wallet based transaction initiated by a consumer at a merchant presentation page, wherein the encrypted payment payload comprises financial data of a finance account of the consumer and the finance account is maintained by an issuer financial institution. The instructions further cause the processor to transmit, by the acquirer processor, a low value token to the merchant, the low value token being devoid of the financial data, and receive, by the acquirer processor from the merchant, an authorization request for the digital wallet based transaction, the authorization request comprising the low value token. The instructions further cause the processor to request, by the acquirer processor, authorization for the transaction from the issuer financial institution using the financial data from the encrypted payment payload, and receive, by the acquirer processor, an authorization decision for the transaction from the issuer financial institution. The instructions further cause the processor to transmit, by the acquirer processor, an authorization response to the merchant.

In an embodiment, the present disclosure is directed, in part, to a payment processing system. The payment processing system comprises an acquirer processor computing system, the acquirer processor computing system comprising one or more processors executing instructions stored in memory, wherein the instructions cause the one or more processors to receive from a digital wallet host an encrypted payment payload in response to a digital wallet based transaction initiated by a consumer at a merchant presentation page, wherein the encrypted payment payload comprises financial data of a finance account of the consumer and the finance account is maintained by an issuer financial institution. The instructions further cause the one or more processors to transmit a low value token to the merchant, the low value token being devoid of the financial data. The instructions further cause the one or more processors to receive from the merchant, an authorization request for the digital wallet based transaction, the authorization request comprising the low value token and request authorization for the transaction from the issuer financial institution using the financial data from the encrypted payment payload. The instructions further cause the one or more processors to receive an authorization decision for the transaction from the issuer financial institution, and transmit an authorization response to the merchant.

BRIEF DESCRIPTION OF THE DRAWINGS

It is believed that certain embodiments will be better understood from the following description taken in conjunction with the accompanying drawings, in which like references indicate similar elements and in which.

DETAILED DESCRIPTION

Figure 1:
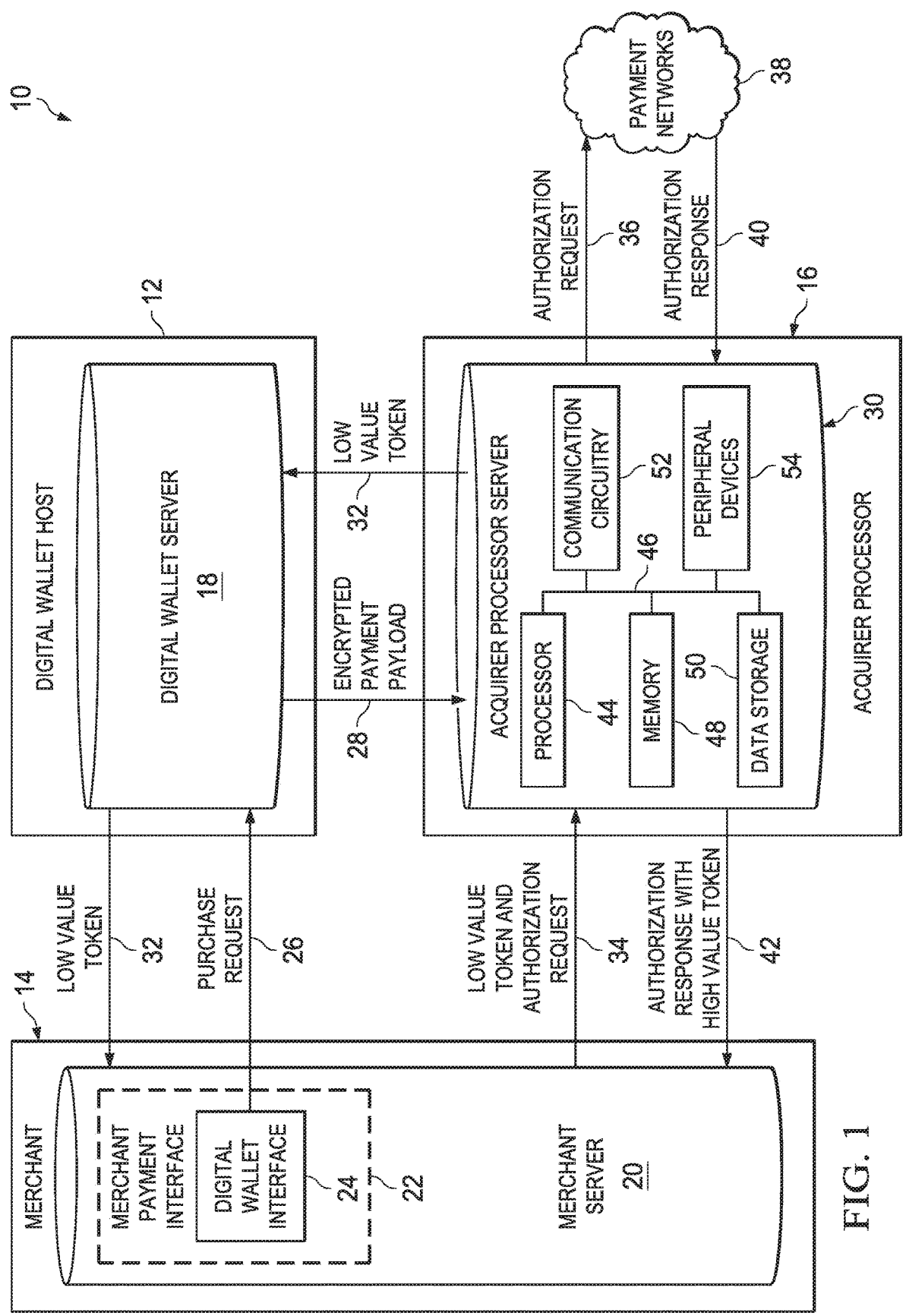
FIG. 1 schematically depicts a payment system in accordance with one embodiment.

Various non-limiting embodiments of the present disclosure will now be described to provide an overall understanding of the principles of the structure, function, and use of systems and methods disclosed herein for tokenizing information from a digital wallet host by an acquirer processor. One or more examples of these non-limiting embodiments are illustrated in the selected examples disclosed and described in detail with reference made to FIGS. 1-3 in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

For simplicity, the description that follows will be provided by reference to a "digital wallet," which generally refers to a personal financial account that is hosted/stored by a digital wallet host for a consumer and includes any type of financial data of the consumer (e.g., a primary account number (PAN)) that is subject to the Payment Card Industry Data Security Standard (PCIDSS) for use in completing a purchase transaction). When the consumer desires to initiate a purchase transaction using the digital wallet (e.g., a digital wallet based transaction), the consumer can select, at the merchant payment interface (e.g., website, point of sale kiosk, or mobile application), the digital wallet interface (e.g., graphical user interface button) that corresponds to the digital wallet host. The merchant can then facilitate transmission of the purchase request to the digital wallet host, which, in response, can request login credentials (e.g., thumbprint, username and password, or biometric information) from the consumer at the merchant payment interface for the consumer's personal financial account held at the digital wallet host. Once the consumer submits the correct login credentials to the digital wallet host and finalizes the purchase transaction with the digital wallet host, the digital wallet host facilitates submission of a request for authorization for the purchase transaction to an issuer financial institution using the financial data stored in the consumer's personal financial account. The digital wallet host then communicates the authorization decision (e.g., approval or denial) from the issuer financial institution to the merchant and the merchant completes the transaction. As is to be clear to those skilled in the art, the financial data of the consumer held at the digital wallet host may not be communicated to the merchant, thus alleviating the PCIDSS compliance burden of the merchant.

For simplicity, the description that follows will also be provided by reference to an "acquirer processor," which generally refers to a financial institution that processes payment vehicle (e.g., credit or debit card) payments on behalf of a merchant and accepts or acquires payments from issuer financial institutions within a payment network.

FIG. 1 is a schematic representation of an example payment system 10 that can include a digital wallet host 12, a merchant 14, and an acquirer processor 16. The digital wallet host 12 can include a digital wallet server 18 that hosts/stores a digital wallet (not shown) for a plurality of consumers. Each of the digital wallets can be associated with a consumer and includes login credentials and financial account information for at least one personal financial account of the consumer. The digital wallet server 18 can cause content to be sent to/from the digital wallet host 12 in any number of formats, such as html messages, text-based messages, multimedia message, email messages, smart phone notifications, web pages, and so forth. The digital wallet server 18 can comprise processors (e.g., CPUs), memory units (e.g., RAM, ROM), non-volatile storage systems (e.g., hard disk drive systems), etc. The digital wallet server 18 can utilize operating systems, such as Solaris, Linux, or Windows Server operating systems, for example.

The merchant 14 can include a merchant server 20 that facilitates presentation of a merchant payment interface 22 to a consumer to facilitate initiation of a purchase transaction by the consumer at the merchant 14. The merchant payment interface 22 can be presented to a consumer as a graphical user interface on any of a variety of computing devices such as a mobile device, a point of sale kiosk, or a personal computer, for example. The merchant payment interface 22 can display a digital wallet interface 24 that is linked to the digital wallet host 12. When the consumer selects the digital wallet interface 24 (e.g., by selecting a button displayed on the merchant payment interface 22), a purchase request 26 can be transmitted to the digital wallet server 18. In response, the digital wallet host 12 can present a request for login credentials to the consumer either directly on the merchant payment interface 22 or by redirecting the consumer to a login page hosted by the digital wallet host 12. The digital wallet host 12 can request any of a variety of login credentials such as, for example, a username and password for the consumer's digital wallet account, biometric data (e.g., a fingerprint), or the like. When the consumer submits the correct login credentials to the digital wallet host 12 and finalizes the purchase transaction (e.g., by selecting a "Place Order" button), the digital wallet host 12 can transmit an encrypted payment payload 28 to the acquirer processor 16 via a server-to-server integration. The encrypted payment payload 28 can include identifying information for the consumer's payment vehicle, such as a BIN number, an expiration date, and a first and last name of the account holder, for example. The encrypted payment payload 28 can also include identifying information from the purchase such as an amount and identifying information from the merchant 14, for example. The encrypted payment payload 28 can also include encryption data such as a network token and a cryptograph, for example.

The encrypted payment payload 28 can be sent to an acquirer processor server 30 of the acquirer processor 16. In response, the acquirer processor server 30 can generate a low value token 32 and transmit the low value token 32 to the merchant server 20 via the digital wallet server 18. In one embodiment, the digital wallet server 18 and the acquirer processor server 30 can be back-end integrated to encourage effective and consistent communication between the servers. The low value token 32 can be a temporary (limited life), randomized value that is devoid of consumer financial data (e.g., credit card number, expiration date, or CCV). In one embodiment, the low-value token 32 can be a randomized 19 digit numeric value having a 24-hour lifetime, such as would be utilized by the "eProtect" eCommerce data security solution offered by Vantiv, Inc., for example.

Once the consumer finalizes the purchase event, the merchant server 20 can submit an authorization request 34 to the acquirer processor server 30 that includes the low value token 32. The acquirer processor server 30 can then decrypt the encrypted payment payload 28 to reveal the consumer's consumer data. The acquirer processor server 30 can then transmit an authorization request 36 for the purchase transaction to a payment network 38 that facilitates processing of a payment for the purchase transaction. The authorization request 36 can include identifying information for the consumer's payment vehicle, such as a BIN number, an expiration date, and a first and last name of the account holder, for example. The authorization request 36 can also include identifying information from the purchase such as an amount and identifying information from the merchant 14, for example. The payment network 38 can be, for example, a network of a credit card associations affiliated with the consumers PCIDSS data. Non-limiting examples of credit card associations include VISA, MASTERCARD, DISCOVER, and AMERICAN EXPRESS. Using information from the authorization request 36, an issuer financial institution (not shown) can associate the purchase transaction with an account of the consumer held by the issuer financial institution. The issuer financial institution can then facilitate transmission of an authorization response 40 from the payment network 38 to the acquirer processor server 30. Upon receiving the authorization response 40, the acquirer processor server 30 can detokenize the low value token 32 received from the merchant server 20 and can convert the detokenized low value token into a high value token. The high value token and an authorization response 42 (indicating the authorization response from the payment networks 38) can be transmitted to the merchant server 20. The authorization response 42 can either be an approval message or a denial message, either of which can complete the purchase transaction. If the purchase transaction is approved, it can be posted to the consumer's account and reconciled later with the digital wallet host 12.

The high value token can be a randomized unique value that is devoid of the consumer's financial data that is subject to PCIDSS (e.g., PCIDSS data) but serves as a surrogate for the consumer's financial data. The high value token can be stored at each of the merchant server 20 and the acquirer processor server 30 such that the same high value token can be used for other of the consumer's purchase transactions until the consumer's financial data changes, such as, for example, when the issuer financial institution issues a different payment vehicle thereby changing the consumer financial data from which the high value token was created. When the consumer's financial data changes, a new high value token can be generated and used for subsequent transactions. The high value token can be stored at the merchant server 20 in lieu of the consumer's financial data such that the merchant 14 does not interact with the consumer's PCIDSS data, thus alleviating the compliance burden of the merchant 14.

The merchant server 20 can cause content to be sent to/from the merchant 14 in any number of formats that facilitate completion of the purchase transaction, such as html messages, text-based messages, multimedia message, email messages, smart phone notifications, web pages, and so forth. The merchant server 20 can comprise processors (e.g., CPUs), memory units (e.g., RAM, ROM), non-volatile storage systems (e.g., hard disk drive systems), etc. The merchant server 20 can also utilize operating systems, such as Solaris, Linux, or Windows Server operating systems, for example. It is to be appreciated that although the merchant server 20 is shown in FIG. 1 to be an individual server, the merchant server 20 can include a plurality of servers. For example, the merchant server 20 can include a webserver for hosting the merchant payment interface and a financial transaction server that communicates with the digital wallet server to exchange transaction-related data.

The acquirer processor server 30 can be embodied as a computing device integrated with other systems or subsystems. In the illustrative embodiment of FIG. 1, the acquirer processor server 30 is shown to a processor 44, a system bus 46, a memory 48, a data storage 50, communication circuitry 52, and one or more peripheral devices 54. Of course, the acquirer processor server 30 can include other or additional components, such as those commonly found in a mainframe, server, and/or computer (e.g., various input/output devices), in other embodiments. Additionally, in some embodiments, one or more of the illustrative components can be incorporated in, or otherwise form a portion of, another component. For example, the memory 48, or portions thereof, can be incorporated in the processor 44 in some embodiments. Furthermore, it should be appreciated that the acquirer processor server 30 can include other components, sub-components, and devices commonly found in a computer and/or computing device, which are not illustrated in FIG. 1 for clarity of the description.

The processor 44 can be embodied as any type of processor or combination of processors capable of performing the functions described herein. For example, the processor 44 can be embodied as a single or multi-core processor, a digital signal processor, microcontroller, a general purpose central processing unit (CPU), a reduced instruction set computer (RISC) processor, a processor having a pipeline, a complex instruction set computer (CISC) processor, an application specific integrated circuit (ASIC), a programmable logic device (PLD), a field programmable gate array (FPGA), a central processor (CP), a system z integrated information processor (zIIP), or other processor or processing/controlling circuit or controller.

In various configurations, the acquirer processor server 30 includes a system bus 46 for interconnecting the various components of the acquirer processor server 30. The system bus 46 can be embodied as, or otherwise include, memory controller hubs, input/output control hubs, firmware devices, communication links (e.g., point-to-point links, bus links, wires, cables, light guides, printed circuit board traces, etc.) and/or other components and subsystems to facilitate the input/output operations with the processor 44, the memory 48, and other components of the acquirer processor server 30. In some embodiments, the acquirer processor server 30 can be integrated into one or more chips such as a programmable logic device or an application specific integrated circuit (ASIC). In such embodiments, the system bus 46 can form a portion of a system-on-a-chip (SoC) and be incorporated, along with the processor 44, the memory 48, and other components of the acquirer processor server 30, on a single integrated circuit chip.

The memory 48 can be embodied as any type of volatile or non-volatile memory or data storage capable of performing the functions described herein. For example, the memory 48 can be embodied as read only memory (ROM), random access memory (RAM), cache memory associated with the processor 44, or other memories such as dynamic RAM (DRAM), static RAM (SRAM), programmable ROM (PROM), electrically erasable PROM (EEPROM), flash memory, a removable memory card or disk, a solid state drive, and so forth. In operation, the memory 48 can store various data and software used during operation of the acquirer processor server 30 such as operating systems, applications, programs, libraries, and drivers.

The data storage 50 can be embodied as any type of device or devices configured for short-term or long-term storage of data such as, for example, memory devices and circuits, memory cards, hard disk drives, solid-state drives, or other data storage devices. For example, in some embodiments, the data storage 50 includes storage media such as a storage device that can be configured to have multiple modules, such as magnetic disk drives, floppy drives, tape drives, hard drives, optical drives and media, magnetooptical drives and media, Compact Disc (CD) drives, Compact Disc Read Only Memory (CD-ROM), Compact Disc Recordable (CD-R), Compact Disc Rewriteable (CD-RW), a suitable type of Digital Versatile Disc (DVD) or Blu-Ray disc, and so forth. Storage media such as flash drives, solid state hard drives, redundant array of individual disks (RAID), virtual drives, networked drives and other memory means including storage media on the processor 44 or the memory 48 are also contemplated as storage devices. It should be appreciated that such memory can be internal or external with respect to operation of the disclosed embodiments. It should also be appreciated that certain portions of the processes described herein can be performed using instructions stored on a computer-readable medium or media that direct or otherwise instruct a computer system to perform the process steps. Non-transitory computer-readable media, as used herein, comprises all computer-readable media except for transitory, propagating signals.

The communication circuitry 52 of the acquirer processor server 30 can be embodied as any type of communication circuit, device, interface, or collection thereof, capable of enabling communications between the acquirer processor server 30 and other computing device communicatively coupled thereto. For example, the communication circuitry 52 can be embodied as one or more network interface controllers (NICs), in some embodiments. The communication circuitry 52 can be configured to use any one or more communication technologies (e.g., wireless or wired communications) and associated protocols (e.g., Ethernet, Wi-Fi®, WiMAX, etc.) to effect such communication.

In some embodiments, the acquirer processor server 30 can communicate with other devices over one or more networks. The network(s) can be embodied as any number of various wired and/or wireless communication networks. For example, the network(s) can be embodied as, or otherwise include, a local area network (LAN), a wide area network (WAN), a cellular network, or a publicly-accessible, global network such as the Internet. Additionally, the network(s) can include any number of additional devices to facilitate communications between the servers of the payment system 10.

Additionally, in some embodiments, the acquirer processor server 30 can further include one or more peripheral devices 54. Such peripheral devices 54 can include any type of peripheral device commonly found in a computing device such as additional data storage, speakers, a hardware keyboard, a keypad, a gesture or graphical input device, a motion input device, a touchscreen interface, one or more displays, an audio unit, a voice recognition unit, a vibratory device, a computer mouse, a peripheral communication device, and any other suitable user interface, input/output device, and/or other peripheral device. It is to be appreciated that, in some embodiments, the digital wallet server 18 and/or the merchant server 20 can be architecturally similar to, or the same as, in many respects as the acquirer processor server 30.

It is to be appreciated that a plurality of different digital wallet hosts (e.g., 12) can exist on the payment system 10, with each digital wallet host requiring a different criteria and set of rules for processing their particular encrypted payment payload (e.g., 28). The acquirer processor server 30 can be configured to process each of the different encrypted payment payloads (e.g., 28) of the digital wallet hosts (e.g., 12) according to the appropriate criteria and set of rules set forth by each digital wallet host (e.g., 12) which can lead to a uniform mechanism of handling diverse methods of payment for the merchant thus alleviating the burden typically experienced with digital wallet based transactions in a conventional payment network. For example, in a conventional payment network, when a digital wallet based transaction is initiated, the encrypted payment payload (e.g., 28) is sent to the merchant (e.g., 14), and the merchant (e.g., 14) must then determine and apply the appropriate criteria and set of rules to the encrypted payment payload (e.g., 28) to complete the purchase transaction. This can be time consuming and expensive to implement and can result in the merchant (e.g., 14) refusing to accept payment from some if not all digital wallet platforms. In addition, by receiving and processing the encrypted payment payload (e.g., 28), the merchant (e.g., 14) can be exposed to consumer PCIDSS data which can be costly and time consuming to protect appropriately (i.e., according to the PCIDSS guidelines).

Figure 2:
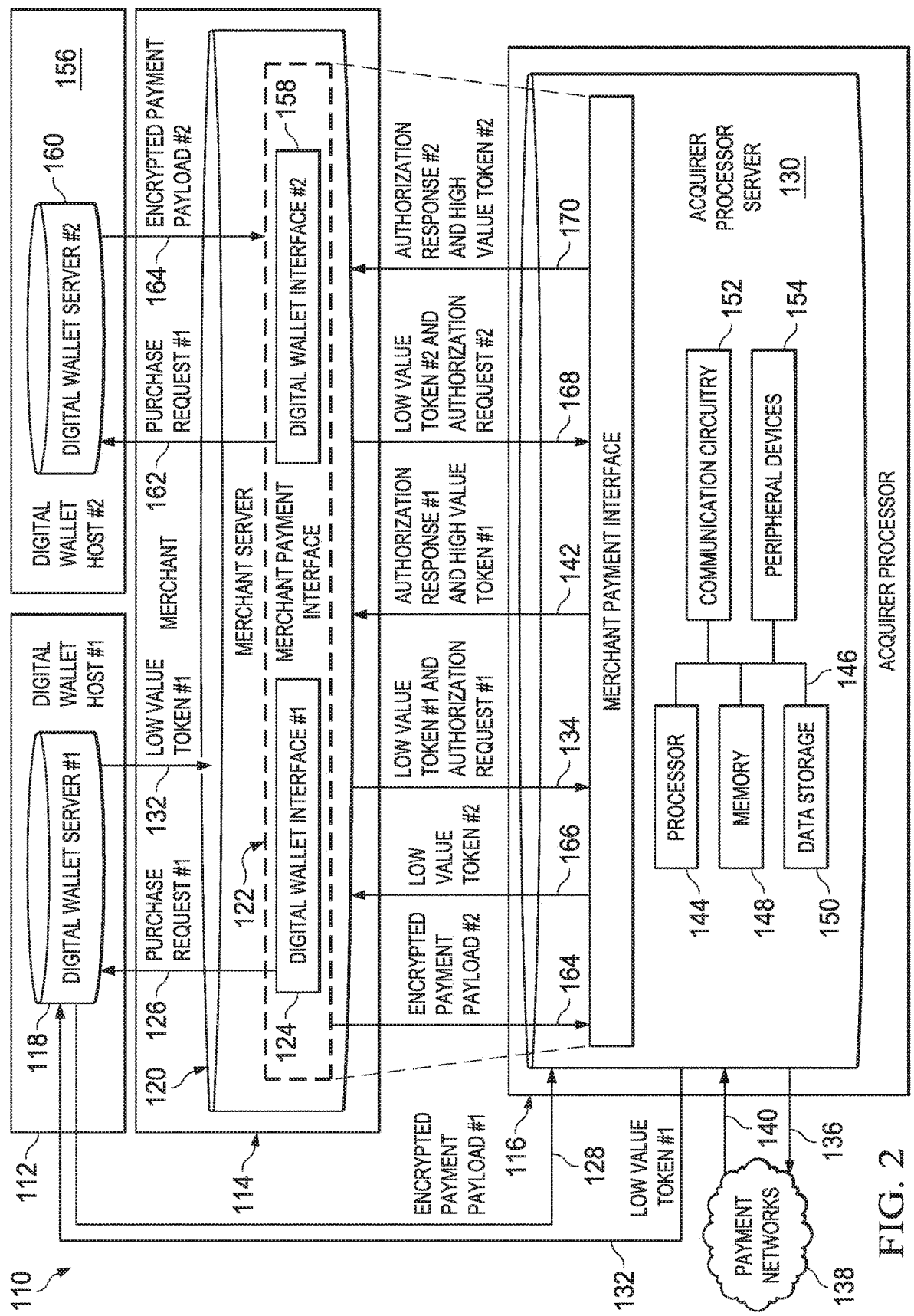
FIG. 2 schematically depicts a payment system in accordance with another embodiment.

FIG. 2 is a schematic representation of an example payment system 110 according to another embodiment. The payment system 110 can be similar to, or the same as, in many respects as the payment system 10 of FIG. 1. For example, the payment system 110 can include a merchant 114 and an acquirer processor 116. The merchant 114 can include a merchant server 120 that facilitates presentation of a merchant payment interface 122 that is hosted on/by the acquirer processor server 130, as described further below. The acquirer processor 116 can include an acquirer processor server 130 that includes a processor 144, a system bus 146, a memory 148, a data storage 150, communication circuitry 152, and one or more peripheral devices 154. The payment system 110 is shown however to include a first digital wallet host 112 and a second digital wallet host 156 that are associated with a first digital wallet interface 124 and a second digital wallet interface 158, respectively, presented on a merchant payment interface 122. The first and second digital wallet hosts 112, 156 can be different such that the consumer is given the option to pay with different digital wallets when initiating a purchase transaction.

The first digital wallet host 112 can be similar to, or the same as, in many respects as the digital wallet host 12 illustrated in FIG. 1. For example, the first digital wallet host 112 can include a first digital wallet server 118 that communicates with the merchant server 120 and the acquirer processor server 130 in a similar manner as the digital wallet server 18 communicates with the merchant server 20 and the acquirer processor server 30 of FIG. 1. For example, when a consumer selects the first digital wallet interface 124, a purchase request 126 can be transmitted to the first digital wallet server 118 which in turn transmits a first encrypted payment payload 128 to the acquirer processor server 130. The acquirer processor server 130 can generate and transmit a first low value token 132 to the merchant server 120 via the first digital wallet server 118. The merchant server 120 can return the first low value token 132 to the acquirer processor server 130 together with a first authorization request 134. The acquirer processor server 130 can then transmit an authorization request 136 for the purchase transaction to a payment network 138 which returns an authorization response 140 to the acquirer processor server 130. The acquirer processor server 130 can then transmit a first high value token together with a first authorization response 142 to the merchant server 120.

The second digital wallet host 156 can be similar to, or the same as, in many respects as the first digital wallet host 112. For example, the second digital wallet host 156 can include a second digital wallet server 160. When the consumer selects the second digital wallet interface 158 (e.g., by selecting a button displayed on the merchant payment interface 122), a second purchase request 162 can be transmitted to the second digital wallet server 160. However, instead of sending an encrypted payment payload to the acquirer processor server 130 (as is the case with the digital wallet server 18 of FIG. 1 and the first digital wallet server 118 of FIG. 2), the second digital wallet server 160 instead transmits a second encrypted payment payload 164 to the merchant payment interface 122, which in turn transmits the second encrypted payment payload 164 to the acquirer processor server 130. Such implementations can be deployed when there is not a server-to-server integration between the second digital wallet server 160 and the acquirer processor server 130. The acquirer processor server 130 can generate and transmit a second low value token 166 to the merchant server 120. The merchant server 120 can return the second low value token 166 to the acquirer processor server 130 together with a second authorization request 168. The acquirer processor server 130 can then transmit an authorization request 136 for the purchase transaction to the payment network 138 which returns the authorization response 140 to the acquirer processor server 130. The acquirer processor server 130 can then generate and transmit a second high value token together with a second authorization response 170 to the merchant server 120.

Still referring to FIG. 2, the acquirer processor server 130 can be configured to generate the merchant payment interface 122 and transmit the merchant payment interface 122 to the merchant server 120 for presentation to a consumer initiating a purchase transaction at the merchant 114 (e.g., at the merchant website or mobile application). The acquirer processor server 130 can transmit the merchant payment interface 122 in such a manner that it is embedded in the presentation page (e.g., webpage) to the consumer and such that any PCIDSS data collected at the merchant payment interface 122 is isolated from the merchant 114. In one embodiment, the acquirer processor server 130 can embed the merchant payment interface 122 in the merchant's presentation page via an inline frame element (e.g., an HTML iframe). In such an embodiment, the merchant 114 can designate a predetermined amount of space for embedding of the merchant payment interface 122 on its presentation page and can implement a call to the acquirer processor server 130 for the merchant payment interface 122 when a consumer loads the presentation page. The merchant payment interface 122 can generally mimic the look and feel of the presentation page. It is to be appreciated that the acquirer processor server 130 can additionally provide/host a variety of different features for the merchant payment interface 122, such as, for example, tender steering, consumer authentication, and fraud detection.

Figure 3:
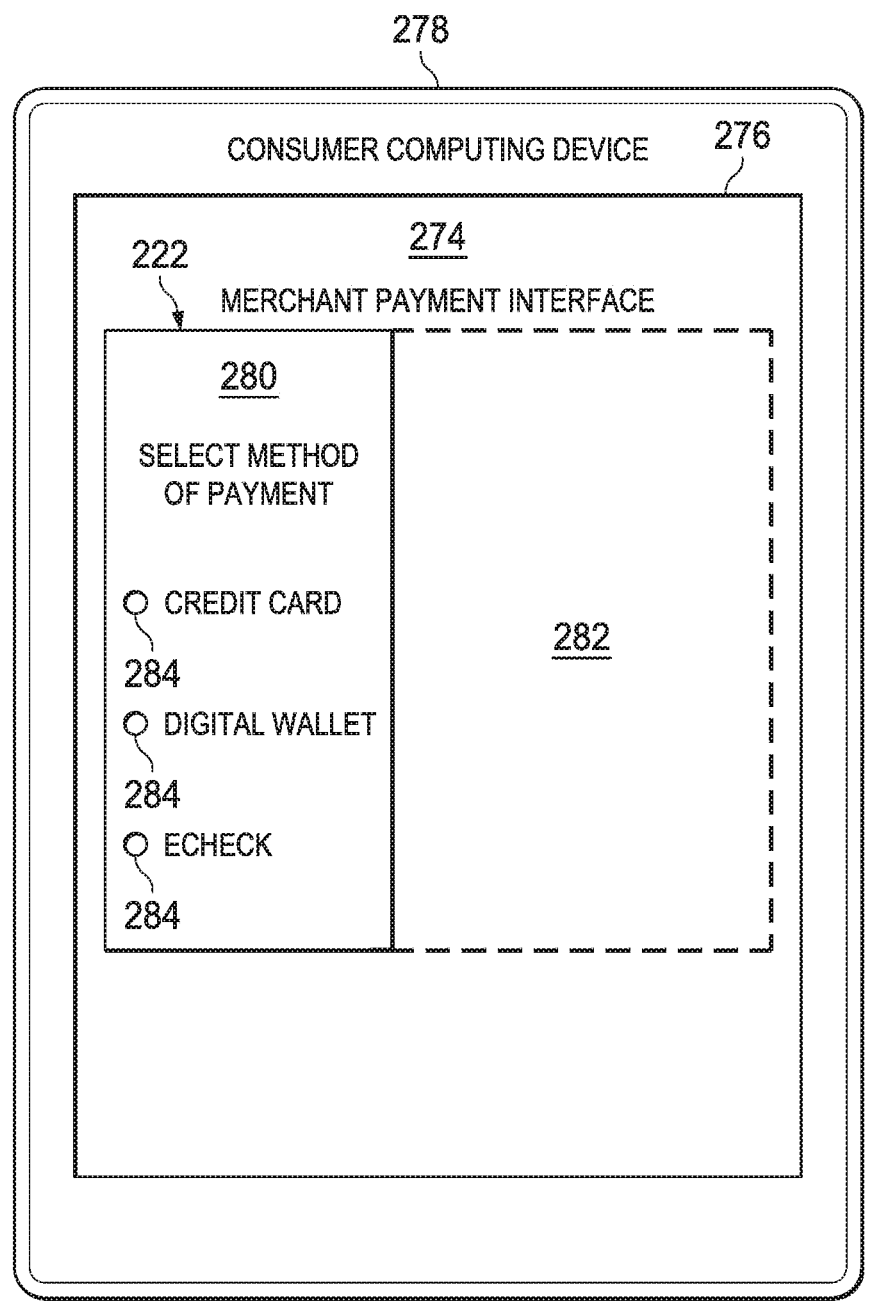
FIG. 3 schematically depicts an example of a presentation page that is presented on a display of a consumer computing device.

FIG. 3 depicts one non-limiting example of a simplified presentation page 274 that is presented on a display 276 of a consumer computing device 278. The consumer computing device 278 can be any electronic device capable of facilitating a consumer's purchase transaction, such as, for example, a mobile computing device (e.g., a cellular phone, tablet computer, etc.) or other type of computing device (e.g., a laptop computer, desktop computer, gaming system, kiosk, etc.). The presentation page 274 can include a merchant payment interface 222 that is similar in many respects to the merchant payment interfaces 22, 122 illustrated in FIGS. 1 and 2, respectively. The merchant payment interface 222 is shown to include a selection field 280 and a payment frame 282. The selection field 280 can have a variety of different radio buttons 284 which can be activated to select the particular payment method that the consumer would like to use. When one of the radio buttons 284 is selected, an acquirer processor (e.g., 30, 130) can populate the payment frame 282 with the appropriate fields to gather the PCIDSS data from the consumer for the selected payment method. For example, when the consumer selects the radio button labeled CREDIT CARD, the payment frame 282 can be populated with various fields that allow for entry of credit card information such fields for the credit card number, expiration date, and CCV code. When the consumer selects the radio button labeled DIGITAL WALLET, the payment frame 282 can be populated with the various digital wallet interfaces (e.g., 24, 124, 158) that allow a consumer to select the particular digital wallet (i.e., digital wallet host) with which to complete the purchase transaction. Once the consumer selects a digital wallet, the payment frame 282 can then be populated with at least one field that receives the login credentials for the consumer. When the consumer selects the radio button labeled ECHECK, the payment frame 282 can be populated with various fields that allow for entry of checking account information such as checking account number and routing number.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed herein should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and include a wide variety of electronic information, including executable code; content such as text, video data, and audio data, among others; and various codes or flags. The terms "information," "data," and "content" are sometimes used interchangeably when permitted by context. It should be noted that, although for clarity and to aid in understanding, some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

These and other embodiments of the systems and methods can be used as would be recognized by those skilled in the art. The above descriptions of various systems and methods are intended to illustrate specific examples and describe certain ways of making and using the systems disclosed and described here. These descriptions are neither intended to be nor should be taken as an exhaustive list of the possible ways in which these systems can be made and used. A number of modifications, including substitutions of systems between or among examples and variations among combinations can be made. Those modifications and variations should be apparent to those of ordinary skill in this area after having read this disclosure.

What is claimed is:

1. A computer-implemented method, comprising:
    generating a merchant-specific payment interface for a merchant;
    transmitting the merchant-specific payment interface to the merchant to be displayed to a consumer via a merchant web page or a merchant mobile application;
    receiving, by an acquirer processor from a digital wallet host by way of the merchant-specific payment interface, an encrypted payment payload including consumer financial data in response to a digital wallet based transaction initiated by the consumer;
    generating, by the acquirer processor, a low value token devoid of the consumer financial data in response to receiving the encrypted payment payload from the digital wallet host;
    transmitting, by the acquirer processor to the merchant, the low value token, devoid of the consumer financial data, corresponding to the digital wallet based transaction;
    receiving, by the acquirer processor from the merchant, an authorization request for the digital wallet based transaction, the authorization request comprising the low value token; and
    transmitting, by the acquirer processor, an authorization response to the merchant.

2. The computer-implemented method of claim 1 further comprising:
    requesting, by the acquirer processor, authorization for the transaction from an issuer financial institution using the consumer financial data from the encrypted payment payload; and
    receiving, by the acquirer processor, an authorization decision for the transaction from the issuer financial institution.

3. The computer-implemented method of claim 1, wherein a high value token is further generated from the consumer financial data of a financial account of the consumer.

4. The computer-implemented method of claim 1, wherein transmitting the low value token to the merchant comprises transmitting the low value token to the digital wallet host for transmission to the merchant.

5. The computer-implemented method of claim 1, further comprising:
    generating, at the acquirer processor, the merchant-specific payment interface that includes a digital wallet interface for the digital wallet host;
    transmitting the merchant-specific payment interface, by the acquirer processor to the merchant, for presentation to the consumer at a merchant presentation page; and
    receiving the consumer financial data from the consumer at the digital wallet interface, wherein the consumer financial data is isolated from the merchant.

6. The computer-implemented method of claim 5, wherein receiving an encrypted payment payload from the digital wallet host comprises receiving the encrypted payment payload at the merchant-specific payment interface.

7. The computer-implemented method of claim 5, wherein the consumer financial data comprises login information to a digital wallet account.

8. A non-transitory computer readable medium having instructions stored thereon which when executed by a processor cause the processor to:
    generate a merchant-specific payment interface for a merchant;
    transmit the merchant-specific payment interface to the merchant to be displayed to a consumer via a merchant web page or a merchant mobile application;
    receive, by an acquirer processor from a digital wallet host by way of the merchant-specific payment interface, an encrypted payment payload including consumer financial data in response to a digital wallet based transaction initiated by the consumer;
    generate, by the acquirer processor, a low value token devoid of the consumer financial data in response to receiving the encrypted payment payload from the digital wallet host;
    transmit, by the acquirer processor to the merchant, the low value token, devoid of the consumer financial data, corresponding to the digital wallet based transaction;
    receive, by the acquirer processor from the merchant, an authorization request for the digital wallet based transaction, the authorization request comprising the low value token; and
    transmit, by the acquirer processor, an authorization response to the merchant.

9. The non-transitory computer readable medium of claim 8, wherein the instructions further cause the one or more processors to:
request, by the acquirer processor, authorization for the transaction from an issuer financial institution using the consumer financial data from the encrypted payment payload; and
receive, by the acquirer processor, an authorization decision for the transaction from the issuer financial institution.

10. The non-transitory computer readable medium of claim 8, wherein transmitting the low value token to the merchant comprises transmitting the low value token to the digital wallet host for transmission to the merchant.

11. The non-transitory computer readable medium of claim 8, wherein the instructions further cause the one or more processors to:
generate, at the acquirer processor, the merchant-specific payment interface that includes a digital wallet interface for the digital wallet host;
transmit the merchant-specific payment interface, by the acquirer processor to the merchant, for presentation to the consumer at a merchant presentation page; and
receive the consumer financial data from the consumer at the digital wallet interface, wherein the consumer financial data is isolated from the merchant.

12. The non-transitory computer readable medium of claim 11, wherein receiving an encrypted payment payload from the digital wallet host comprises receiving the encrypted payment payload at the merchant-specific payment interface.

13. The non-transitory computer readable medium of claim 11, wherein the consumer data comprises login information to a digital wallet account.

14. A payment processing system, comprising:
an acquirer processor computing system, the acquirer processor computing system comprising one or more processors executing instructions stored in memory, wherein the instructions cause the one or more processors to:
generate a merchant-specific payment interface for a merchant;
transmit the merchant-specific payment interface to the merchant to be displayed to a consumer via a merchant web page or a merchant mobile application;
receive from a digital wallet host by way of the merchant-specific payment interface an encrypted payment payload including consumer financial data in response to a digital wallet based transaction initiated by the consumer;
generate a low value token devoid of the consumer financial data in response to receiving the encrypted payment payload from the digital wallet host;
transmit the low value token, devoid of the consumer financial data, to the merchant, the low value token corresponding to the digital wallet based transaction;
receive from the merchant, an authorization request for the digital wallet based transaction, the authorization request comprising the low value token; and
transmit an authorization response to the merchant.

15. The payment processing system of claim 14, wherein the instructions further cause the one or more processors to:
request authorization for the transaction from an issuer financial institution using the consumer financial data from the encrypted payment payload; and
receive an authorization decision for the transaction from the issuer financial institution.

16. The payment processing system of claim 14, wherein the instructions causing the one or more processors to transmit the low value token to the merchant further comprise instructions for transmitting the low value token to the digital wallet host for transmission to the merchant.

17. The payment processing system of claim 14, wherein the instructions further cause the one or more processors to:
generate the merchant-specific payment interface that includes a digital wallet interface for the digital wallet host; and
transmit the merchant-specific payment interface for presentation to the consumer at a merchant presentation page; and
receive the consumer financial data from the consumer at the digital wallet interface, wherein the consumer financial data is isolated from the merchant.

18. The payment processing system of claim 17, wherein the instructions causing the one or more processors to receive the encrypted payment payload from the digital wallet host further comprise instructions to receive the encrypted payment payload at the merchant-specific payment interface.

* * * * *